(12) United States Patent
Sohn

(10) Patent No.: US 7,659,014 B2
(45) Date of Patent: Feb. 9, 2010

(54) ELECTRODE ASSEMBLY HAVING SUPER-CAPACITOR AND LITHIUM SECONDARY BATTERY HAVING THE SAME

(75) Inventor: Youngbae Sohn, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 627 days.

(21) Appl. No.: 11/411,428

(22) Filed: Apr. 25, 2006

(65) Prior Publication Data

US 2006/0263649 A1 Nov. 23, 2006

(30) Foreign Application Priority Data

Apr. 25, 2005 (KR) ................. 10-2005-0034222

(51) Int. Cl.
*H01M 2/26* (2006.01)
*H01M 16/00* (2006.01)
(52) U.S. Cl. .................. 429/7; 429/161; 429/211
(58) Field of Classification Search .............. 429/7, 429/161, 211
See application file for complete search history.

(56) References Cited

U.S. PATENT DOCUMENTS 6,117,585 A * 9/2000 Anani et al. ............ 429/161 X
6,645,663 B2 * 11/2003 Bean et al. ................. 429/7 X
2005/0266278 A1 * 12/2005 Jung et al. ................... 429/7

FOREIGN PATENT DOCUMENTS

| JP | 2001-351688 | 12/2001 |
| KR | 2002-0051292 | 6/2002 |
| KR | 2003-0081776 | 10/2003 |

OTHER PUBLICATIONS

Patent Abstracts of Japan, Publication No. 2001-351688, dated Dec. 21, 2001, in the name of Kazuo Takada et al.
Korean Patent Abstracts, Publication No. 1020020051292 A, dated Jun. 28, 2002, in the name of Sun Ho Jang, et al.
Korean Patent Abstracts, Publication No. 1020030081776A, dated Oct. 22, 2003, in the name of Jeong Gi Park et al.

* cited by examiner

*Primary Examiner*—Stephen J. Kalafut
(74) *Attorney, Agent, or Firm*—Christie, Parker & Hale, LLP

(57) ABSTRACT

An electrode assembly having a super-capacitor for allowing high current charge/discharge operations and a lithium secondary battery having the same. The electrode assembly includes first and second electrode plates, a separator interposed between the first and second electrode plates; and a super-capacitor. Each plate has an electrode charge collector, an activation material layer formed on at least one surface of the electrode charge collector, and an electrode tap attached to the electrode charge collector.

14 Claims, 3 Drawing Sheets

ELECTRODE ASSEMBLY HAVING SUPER-CAPACITOR AND LITHIUM SECONDARY BATTERY HAVING THE SAME

CROSS-REFERENCE TO RELATED PATENT APPLICATION

This application claims priority to and the benefit of Korean Patent Application No. 10-2005-0034222 filed in the Korean Intellectual Property Office on Apr. 25, 2005, the entire content of which is incorporated herein by reference.

BACKGROUND OF THE INVENTION

1. Field of the Invention

The invention relates to an electrode assembly and a lithium secondary (rechargeable) battery having the same, and more particularly to, an electrode assembly having a super-capacitor for allowing high-rate charge/discharge operations and a lithium secondary battery having the same.

2. Description of Related Art

Recently, compact and lightweight electric/electronic devices such as cellular phones, laptop computers, and camcorders are being widely developed and produced. Such portable electric/electronic devices are typically provided with a battery pack so that they can be operated in any place where a separate power supply is not connected. The battery pack has at least one battery to drive the portable electric/electronic devices for a predetermined time period.

Now, rechargeable secondary batteries are usually adopted in consideration with cost efficiency. For example, rechargeable secondary batteries such as Ni—Cd, Ni—MH, Li, and Li-ion batteries are available in the art.

Particularly, the lithium secondary battery has a high energy density per unit weight and an operation voltage of 3.6V, which is triple that of a Ni—Cd battery or a Ni—MH battery, which are widely used as power supplies for portable electronic devices. Therefore, the lithium secondary battery is increasingly used in the art.

In the lithium secondary battery, lithium based oxide is used as a positive electrode activation material, while a carbon based material is used as a negative electrode activation material. Generally, the lithium secondary battery is classified into either a liquid electrolyte battery or a polymer electrolyte battery depending on the electrolyte used therein. A battery using the liquid electrolyte is referred to as a lithium ion battery, and a battery using the polymer electrolyte is referred to as a lithium polymer battery. In addition, the lithium secondary battery is fabricated in a variety of shapes such as cylindrical, rectangular, pouch types, and the like.

Typically, a lithium secondary battery includes an electrode assembly, a case storing the electrode assembly, and an electrolyte injected into inside of the case to allow lithium ions to travel. The electrode assembly is formed by winding: a positive electrode plate to which a positive electrode tap is attached, a negative electrode plate to which a negative electrode tap is attached, and a separator interposed between the positive and negative electrode plates to prevent a short circuit and allow only lithium ions to travel.

The lithium secondary battery may be formed as follows.

First, a positive electrode is coated with a positive electrode activation material, and a positive electrode tap is connected thereto, and a negative electrode plate is coated with a negative electrode activation material, and a negative electrode tap is connected thereto. The coated positive electrode, coated negative electrode, and a separator are stacked and then wound to provide an electrode assembly.

Subsequently, the electrode assembly is inserted into a case so that the electrode assembly will not separate. Then, an electrolyte is injected into the case and the case is sealed, thereby completing the lithium secondary battery However, a conventional lithium secondary battery does not satisfy the requirements of high energy density and output density for high performance electronic devices such as Global System for Mobile Communication (GSM) phones and hybrid vehicles.

Such high performance electronic devices require excellent initial discharge properties, and conventional lithium secondary batteries cannot satisfy this requirement.

SUMMARY OF THE INVENTION

The invention provides an electrode assembly having a super-capacitor for allowing operations at high charge/discharge rates, and a lithium secondary battery having the same.

According to an embodiment of the invention, an electrode assembly is provided including: first and second electrode plates, each having an electrode charge collector, an activation material layer formed on at least one surface of the electrode charge collector, and an electrode tap attached to a bare portion of the electrode charge collector; a separator interposed between the first and second electrode plates; and a super-capacitor. According to an embodiment of the invention, the super-capacitor may be made by adapting materials with high dielectric constants as a separator or as a part of a separator. The portion of the separator may be a portion corresponding to a bare portion of the electrode charge collector. The electric materials may be $HfO_2$, $ZrO_2$, $TiO_2$ and the like.

In one embodiment, the super-capacitor may include a super-capacitor electrode layer formed on a bare portion of the first or second electrode plate, between the activation layer and the electrode tap. In an embodiment, the first and second electrode plates may be arranged to allow the super-capacitor electrode layers to face each other.

In one embodiment, the super-capacitor electrode layer may include a material selected from the group consisting of carbon-based materials, conductive polymers, metal oxides, and combinations thereof.

In one embodiment, the carbon based material may include a material selected from the group consisting of activated carbon powder (ACP), activated carbon fiber (ACF), and combinations thereof, and the metal oxide may be made of a material selected from the group consisting of RuOx, IrOx, and combinations thereof.

In one embodiment, the super-capacitor may have an electrostatic capacity in the range of 0.1 to 10 F.

According to one embodiment of the invention, a lithium secondary battery is provided having an electrode assembly including: first and second electrode plates, each having an electrode charge collector, an activation material layer formed on at least one surface of the electrode charge collector, and an electrode tap attached to a bare portion of the electrode charge collector; a separator interposed between the first and second electrode plates; and a super-capacitor.

According to one embodiment the invention, a lithium secondary battery is provided including a battery unit for charging/discharging voltage, and a super-capacitor unit charged by the battery unit to facilitate operation at a high discharge rate.

BRIEF DESCRIPTION OF THE DRAWINGS

The above and other features and embodiments of the invention will become more apparent by describing, in detail, exemplary embodiments thereof with reference to the attached drawings in which.

DETAILED DESCRIPTION OF EXEMPLARY EMBODIMENTS

Figure 1:
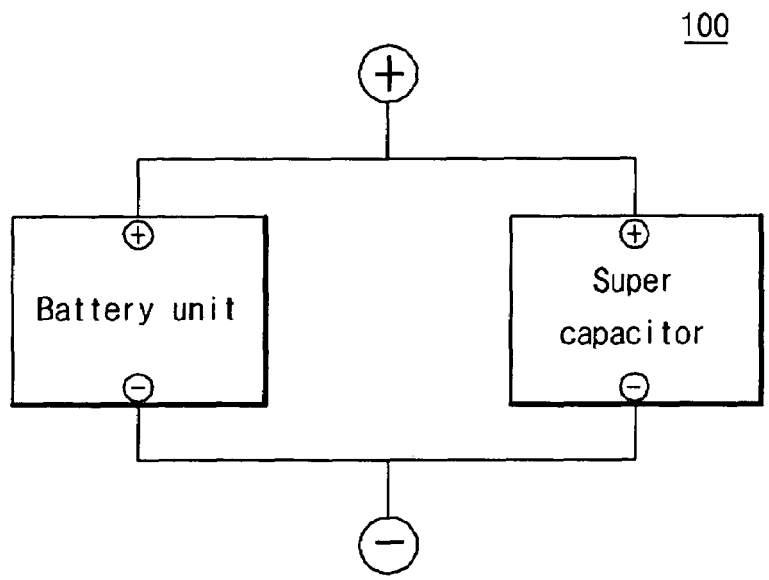
FIG. 1 is a conceptual view of a lithium secondary battery according to an embodiment of the invention.

Hereinafter, exemplary embodiments of the invention will now be described in detail with reference to the accompanying drawings, in which like reference numerals refer to like elements.

Referring to FIG. 1, a lithium secondary battery 100 according to an embodiment of the invention includes a super-capacitor unit for operating at a high discharge rate, and a battery unit for charging the super capacitor unit.

The battery unit is charged by an external power supply, and supplies current to an electronic device, which is connected to the lithium secondary battery 100.

The high current capacitor unit is charged by the battery unit or an external power supply, and supplies high current when an electronic device is operated. In one embodiment, the super-capacitor unit has an electrostatic capacity of 0.1 to 10 F. The super-capacitor supplies an initial high current during starting operations because the conventional secondary battery may not supply as high of a current, although the electronic device, particularly a high performance electronic device, may require high current during its startup operations.

Figure 2A:
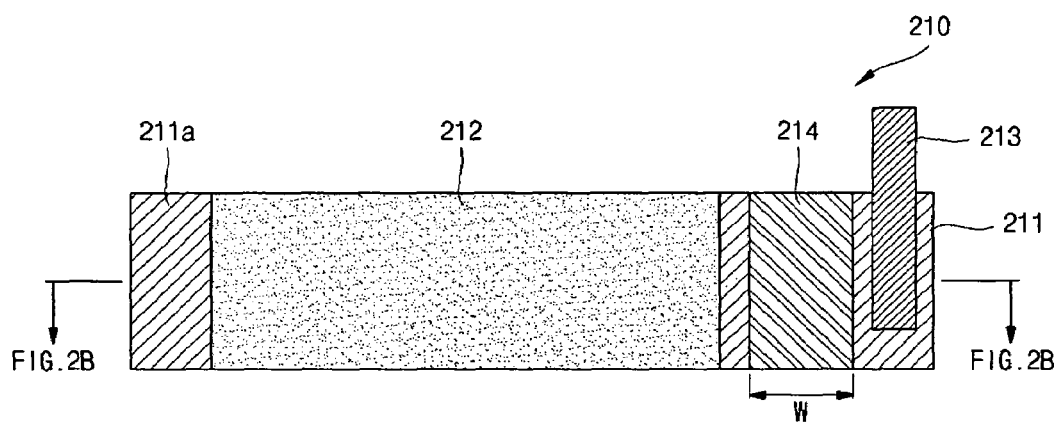
FIG. 2A is a schematic top plan view of an electrode plate used in a lithium secondary battery according to an embodiment of the invention.
Figure 2B:
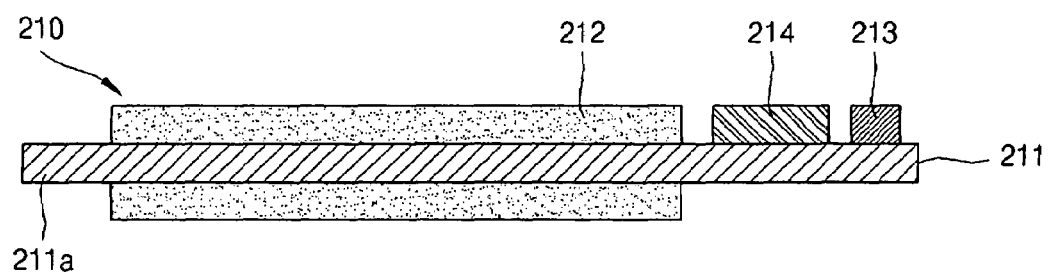
FIG. 2B is a cross-sectional view of an electrode plate used in a secondary battery according to an embodiment of the invention.

FIGS. 2A and 2B are a top plan view and a cross-sectional view, respectively, of an electrode plate used in a lithium secondary battery according to an embodiment of the invention.

Figure 3A:
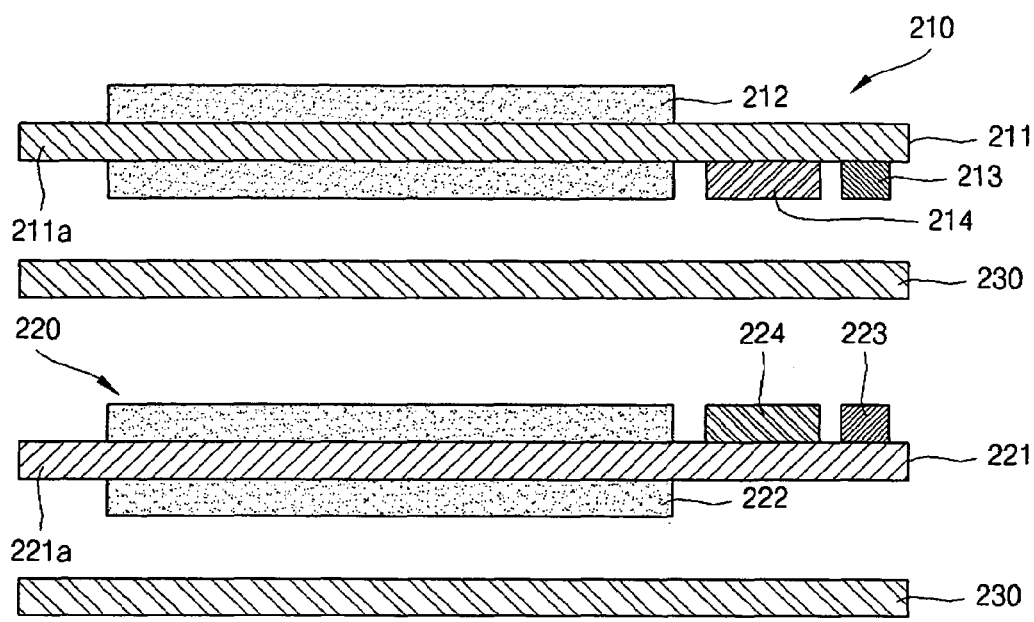
FIGS. 3A and 3B are diagrams of a jelly roll type electrode assembly adopted in a lithium secondary battery according to an embodiment of the invention.
Figure 3B:
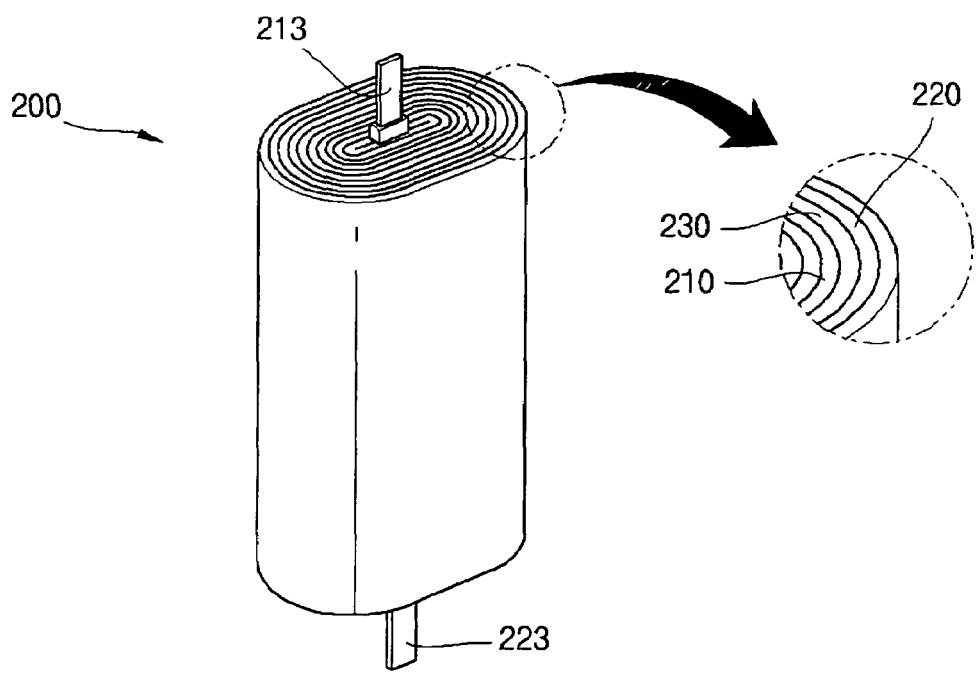

FIGS. 3A and 3B are views of a jelly roll type electrode assembly adopted in a lithium secondary battery according to an embodiment of the invention. FIG. 3A illustrates a cross-sectional view of an arrangement of two electrode plates and a separator before they are wound, and FIG. 3B illustrates a jelly roll type electrode assembly after they are wound.

A lithium secondary battery having a super-capacitor according to an embodiment of the invention includes a first electrode plate 210, a second electrode plate 220, and a super-capacitor electrode layer 214 and 224 to provide super-capacity.

In a lithium secondary battery having a super-capacitor according to an embodiment of the invention, a super-capacitor electrode layer 214, 224 is formed on a bare portion 211a, 221a of a charge collector 211, 221, between an activation material layer 212, 222 and an electrode tap 213, 223. Then, the first and second electrodes 210, 220 having the super-capacitor electrode layer 214, 224 are positioned to allow the super-capacitor electrode layers 214, 224 to face each other. Subsequently, they are wound to provide a jelly roll type electrode assembly 200. In an embodiment, the super-capacitor characteristics may be utilized by fabricating a lithium secondary battery using the aforementioned electrode assembly 200.

In one embodiment, the super-capacitor provided by the super-capacitor electrode layer has an electrostatic capacity in the range of 0.1 to 10 F.

A lithium secondary battery having a super-capacitor according to an embodiment of the invention, and a method of fabricating the same will be described with reference to FIGS. 2A, 2B, 3A, and 3B.

First, an electrode plate 210 for a secondary battery as shown in FIGS. 2A and 2B, is prepared.

In one embodiment, the electrode plate 210 for a secondary battery includes an electrode charge collector 211, an activation material layer 212 formed on at least one surface of the charge collector 211, an electrode tap 213 attached to a bare portion 211a of the electrode charge collector 211, and a super-capacitor electrode layer 214.

In an embodiment, if the electrode plate 210 for a secondary battery is a positive electrode plate, the electrode charge collector 211 is made of a metal film, such as aluminum foil, having an excellent conductivity, and the activation material layer 212 is made of a positive electrode activation material, a conductor, and an adhesive. In one embodiment, the positive activation material may include a chalcogenide compound or composite metal oxide such as $LiCoO_2$, $LiMn_2O_4$, $LiNiO_2$, $LiNi1-xCoxO_2 (0<x<1)$, $LiMnO_2$, and combinations thereof, but is not limited thereto.

In one embodiment, if the electrode plate 220 for a secondary battery is a negative electrode plate, the electrode charge collector 221 is made of a metal such as a copper or nickel foil, and the activation material layer 222 is made of a conductor and an adhesive. In an embodiment, the negative electrode activation material may include a material selected from the group consisting of carbon-based materials, Si, Sn, tin oxides, composite tin alloys, transition metal oxides, lithium metal nitrides, lithium metal oxides, and combinations thereof, but is not limited thereto.

In one embodiment, the super-capacitor electrode layer 214 is formed on the bare portion 211a between the activation material layer 212 and the electrode tap 213.

In one embodiment, if the super-capacitor is an electric double layer capacitor (EDLC), the super-capacitor electrode layer 214 may be made of a slurry formed by mixing a carbon-based material with a binder using a solvent. In an embodiment, the carbon-based material may include an activated carbon powder (ACP), an activated carbon fiber (ACF), and combinations thereof, but is not limited thereto.

In one embodiment, if the super-capacitor is a pseudo capacitor, the super-capacitor electrode layer 214 may be made of a slurry formed by mixing one of a conductive polymer and metal oxides, a conductor, and a binder using a solvent. In an embodiment, the metal oxide is selected from the group consisting of $RuOx$, $IrOx$, and combinations thereof, but is not limited thereto.

In one embodiment, as shown in FIG. 3A, the first and second electrodes 210, 220 having the super-capacitor electrode layers 214, 224, and two separators 230 are arranged in the order of the first electrode 210, a separator 230, the second electrode 220, and a separator 230.

In one embodiment, the first electrode plate 210 is used as one of the positive or negative electrode plates, for example, a positive electrode plate, while the second electrode plate 220 is used as the other, for example, a negative electrode plate.

In one embodiment, the separator 230 is provided to prevent a short circuit between the first and second electrode plates 210, 220 and to allow only charges to move, for example, lithium ions moving in a lithium secondary battery 100. In an embodiment, the separator 230 may be made of a material selected from the group consisting of polyethylene, polypropylene, copolymers of polyethylene and polypropylene, and combinations thereof, but is not limited thereto. In one embodiment, the separator 230 protrudes in a predetermined width, for example, 1 to 2 mm, over the first and second electrode plates 210, 220 to prevent a short circuit between the first and second electrode plates 210, 220.

In an embodiment, the first and second electrode plates 210, 220 are positioned to allow the super-capacitor electrode layers 214, 224 to face each other.

In one embodiment, the first electrode plate 210, a separator 230, the second electrode plate 220, and a separator 230 are arranged in the preceding order, and then wound to provide the jelly roll type electrode assembly 200 as shown in FIG. 3B.

Although not shown in the drawings, in an embodiment, the separator may cover one of the first or second electrode plates 210, 220, for example, the second electrode plate 220. In an embodiment, they may be wound to provide a jelly roll type electrode assembly 200.

Figure 4:
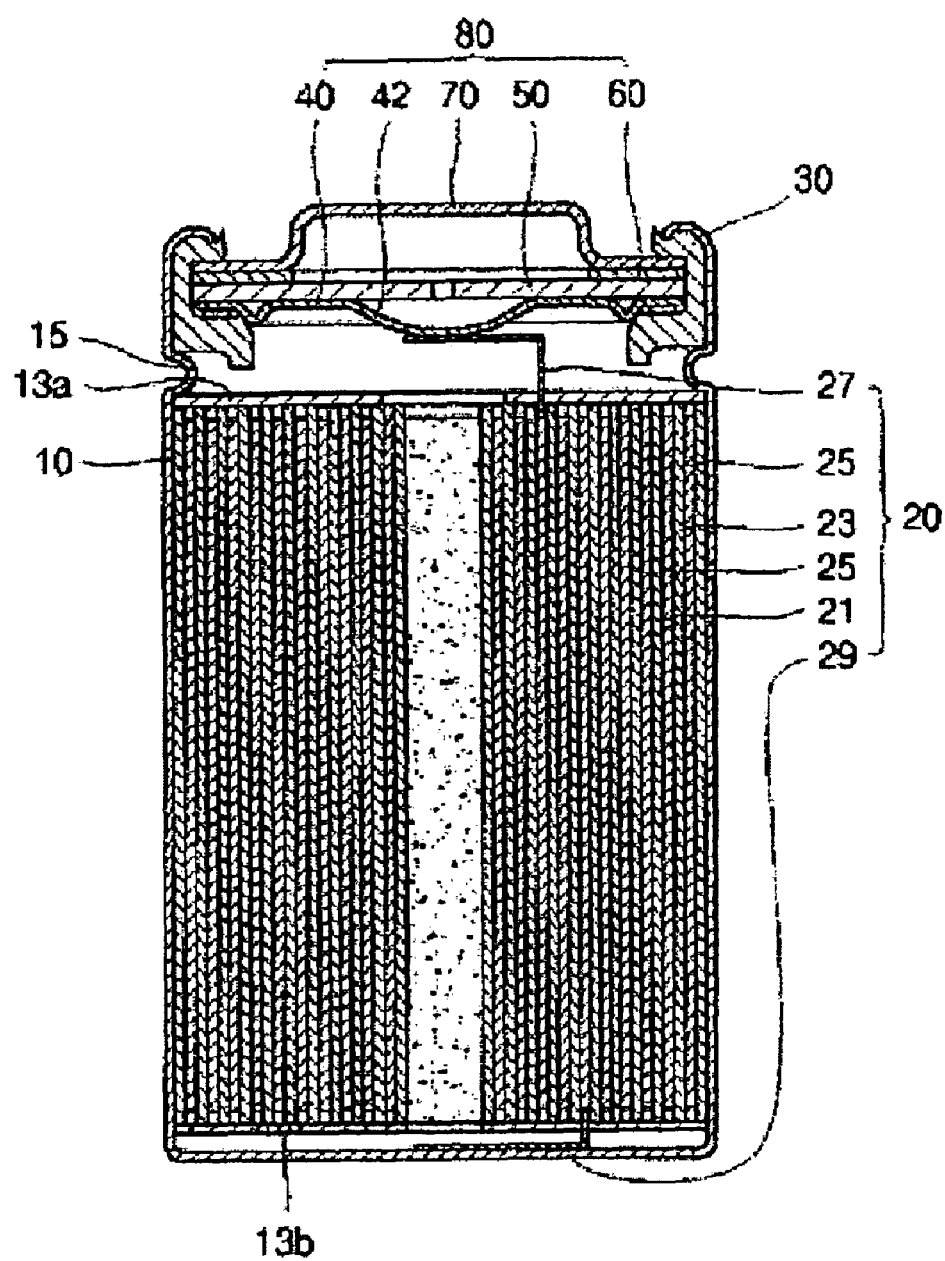
FIG. 4 is a front cross-sectional view illustrating the structure of a cylinder type secondary battery according to one embodiment of the invention.

FIG. 4 is a front cross-sectional view illustrating a structure of a cylinder type secondary battery according to one embodiment of the invention. According to FIG. 4, two electrodes 25 having a rectangular plate shape and separators 21, 23 interposed between the electrodes 25 to prevent a short circuit between the two electrodes 25 are stacked and wound in a jelly roll configuration to provide an electrode assembly 20. In an embodiment, each electrode is formed by coating an active material slurry on a charge collector made of a metallic foil.

In an embodiment, uncovered areas without the slurry are located at either end of the charge collector and are provided with electrode taps 27, 29 and dielectric material (not shown) of a super conductor unit for each electrode plate. In one embodiment, the electrode taps 27, 29 are electrically connected to a cylindrical can 10, and a cap assembly 80 insulated from the cylindrical can 10 to form part of a path for connecting the electrode assembly to external circuits during charging and discharging of the secondary battery. In an embodiment, from the electrode assembly 20, one electrode tap 27 is drawn upward to an opening of the cylindrical can 10, and the other electrode tap 29 is drawn downward.

In one embodiment, the electrode assembly is inserted into the cylindrical can 10 through the opening with upper and lower insulating plates 13a, 13b. Then, beads 15 for preventing floating of the electrode assembly in the can are formed in the cylindrical can 10 and electrolyte is injected into the cylindrical can 10. An insulating gasket 30 is provided on the inner sidewall of the can in the vicinity of the opening and a cap assembly 80 for capping the opening is provided on the inside of the gasket 30.

In the cap assembly 80 according to an embodiment, a bent assembly, a positive thermal coefficient (PTC) element 60, and an upper cap 70 having an electrode terminal are included. In one embodiment, the bent assembly includes a bent cap 40 at the lower side and a current interrupt device (CID) 50 which would be fractured in combination with the bent cap 40 to cut off a current path.

Subsequently in an embodiment, clamping methods are performed to seal the cylindrical can 10 by pressing the sidewall of the opening of the cylindrical can 10 toward the center of the can using the upper cap 70 inserted into the gasket 30 as a stopper. In addition, tubing work is performed to form an exterior of the battery.

In connecting the electrode taps 27, 29 in an embodiment, the electrode tap 29 extending downward is welded to a bottom surface of the cylindrical can with the lower insulating plate 13b therebetween and the electrode tap extending upward 27 is welded to the bent cap 40 through a hole in the upper insulating plate 13a.

In one embodiment, the upward electrode tap 27 is long enough to easily weld the upward electrode tap 27 and the protrusion 42 of the bent cap 40 to each other. The electrode tap 27 is bent and the bent assembly is inserted into the opening of the cylindrical can with the gasket 30. This operation requires a space between the bent assembly and the electrode assembly 20.

Since extra length of the upward electrode tap 27 is difficult to dispose after welding, the length of the upward electrode tap is determined in a workable range. In an embodiment, the portion of the upward electrode tap 27 remaining after welding may be positioned in a space between the cap assembly and the electrode assembly, and the upper insulating plate 13a may serve to prevent a short circuit between the upward electrode tap 27 and the other electrode 25 of the electrode assembly.

Subsequently, although not shown in the drawings, a typical process for fabricating a lithium secondary battery may be followed. For example, the electrode assembly 200 may be inserted into a case for a secondary battery, and then a cap assembly may be attached to it.

According to one embodiment of the invention, an electrode assembly is provided which has a super-capacitor for allowing a high current charge/discharge rate and a lithium secondary battery having the same.

While the invention has been particularly shown and described with reference to exemplary embodiments thereof, it will be understood by those skilled in the art that various changes in form and details may be made therein without departing from the spirit and scope of the invention as defined by the appended claims, and their equivalents.

What is claimed is:

1. An electrode assembly comprising:
   first and second electrode plates, each of the electrode plates comprising an electrode charge collector, an activation material layer on a portion of at least one surface of the electrode charge collector, and an electrode tap attached to the electrode charge collector;
   a separator between the first and second electrode plates; and
   a super-capacitor electrode layer on at least one of the electrode plates between the activation material layer and the electrode tap, and forming a super-capacitor with the first and second electrode plates.

2. The electrode assembly according to claim 1, wherein the super-capacitor comprises at least a portion of the separator.

3. The electrode assembly according to claim 1, wherein each of the first and second electrode plates has a super-capacitor electrode layer, and the super-capacitor electrode layers of the electrode plates face each other.

4. The electrode assembly according to claim 1, wherein the super-capacitor electrode layer includes a material selected from the group consisting of carbon-based materials, conductive polymers, metal oxides, and combinations thereof.

5. The electrode assembly according to claim 4, wherein the carbon based materials include a material selected from the group consisting of activated carbon powder (ACP), activated carbon fiber (ACF), and combinations thereof.

6. The electrode assembly according to claim 4, wherein the metal oxides include a material selected from the group consisting of RuOx, IrOx, and combinations thereof.

7. The electrode assembly according to claim 1, wherein the super-capacitor has an electrostatic capacity of 0.1 to 10 F.

8. A lithium secondary battery comprising an electrode assembly, the electrode assembly comprising:
   first and second electrode plates, each of the electrode plates comprising an electrode charge collector, an activation material layer on a portion of at least one surface of the electrode charge collector, and an electrode tap attached to the electrode charge collector;
   a separator between the first and second electrode plates; and
   a super-capacitor electrode layer on at least one of the electrode plates between the activation material layer and the electrode tap, and forming a super-capacitor with the first and second electrode plates.

9. The lithium secondary battery according to claim 8, wherein each of the first and second electrode plates has a super-capacitor electrode layer, and the super-capacitor electrode layers of the electrode plates face each other.

10. The lithium secondary battery according to claim 8, wherein the super-capacitor electrode layer comprises a material selected from the group consisting of carbon-based materials, conductive polymers, metal oxides, and combinations thereof.

11. The lithium secondary battery according to claim 8, wherein the super-capacitor has an electrostatic capacity of 0.1 to 10 F.

12. A lithium secondary battery comprising:
   a battery unit for at least one of charging or discharging a voltage; and
   a capacitor unit chargeable by the battery unit and adapted to allow current discharge operations, the capacitor unit comprising a super-capacitor electrode layer on an electrode plate of the battery unit, the super-capacitor electrode layer being between an activation material layer and an electrode tap on the electrode plate.

13. The lithium secondary battery according to claim 12, wherein the capacitor unit has an electrostatic capacity of 0.1 to 10 F.

14. The lithium secondary battery according to claim 12, wherein the capacitor unit is a super-capacitor unit.

* * * * *

UNITED STATES PATENT AND TRADEMARK OFFICE
CERTIFICATE OF CORRECTION

| | | |
|---|---|---|
| PATENT NO. | : 7,659,014 B2 | Page 1 of 1 |
| APPLICATION NO. | : 11/411428 | |
| DATED | : February 9, 2010 | |
| INVENTOR(S) | : Youngbae Sohn | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Thirtieth Day of November, 2010

David J. Kappos
*Director of the United States Patent and Trademark Office*